April 5, 1932.  A. R. BAGGARLY  1,852,912
AEROPLANE BRAKE
Filed Oct. 19, 1931   3 Sheets-Sheet 2
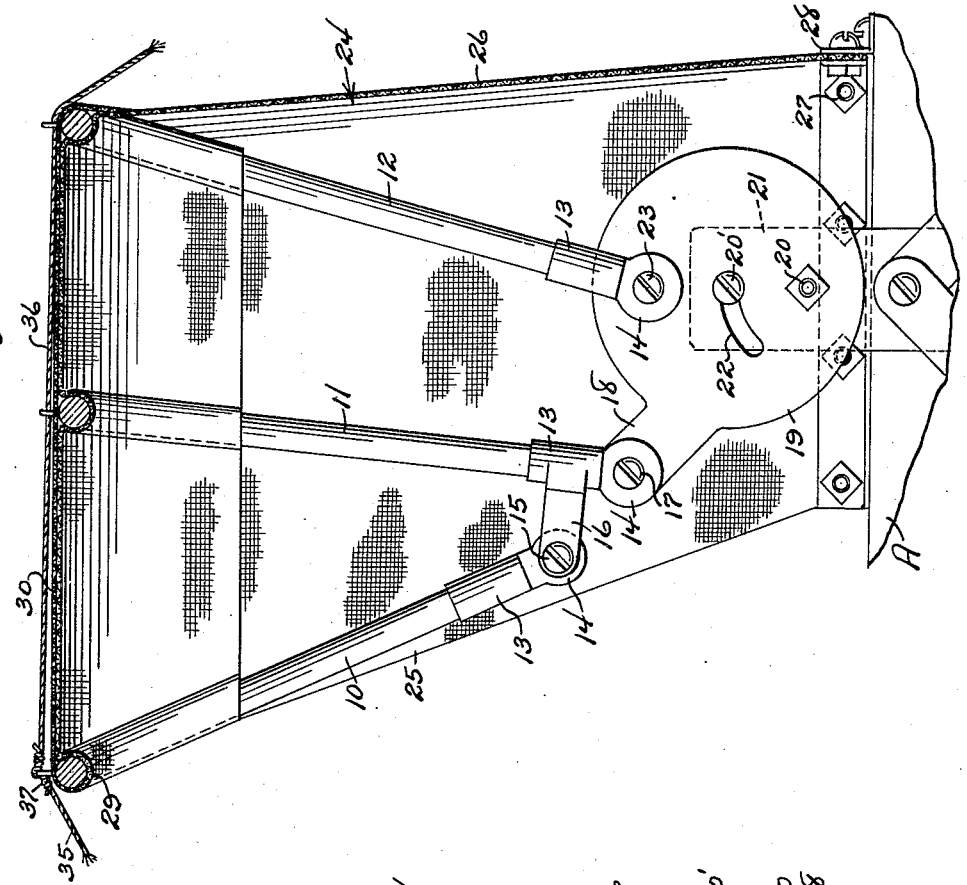
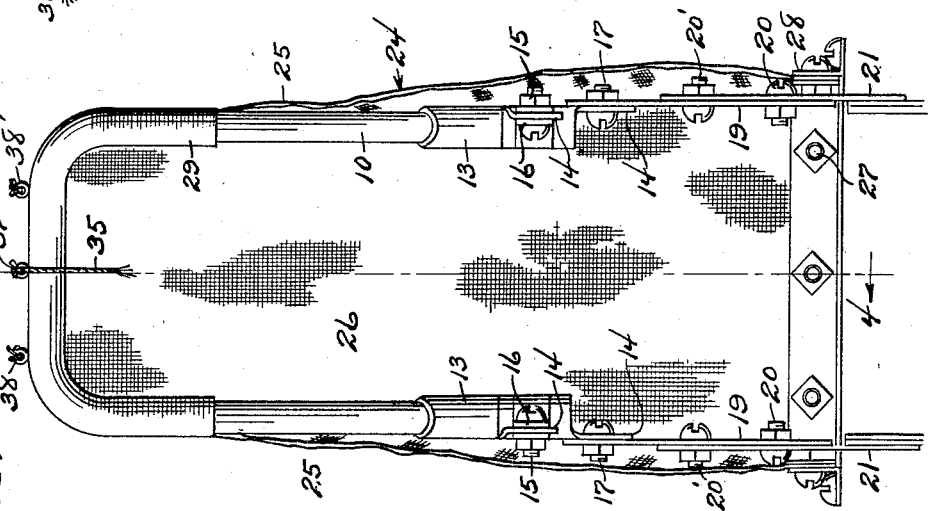
Andrew R. Baggarly
INVENTOR
BY Victor J. Evans
and Co. ATTORNEY April 5, 1932.  A. R. BAGGARLY  1,852,912
AEROPLANE BRAKE
Filed Oct. 19, 1931  3 Sheets-Sheet 3

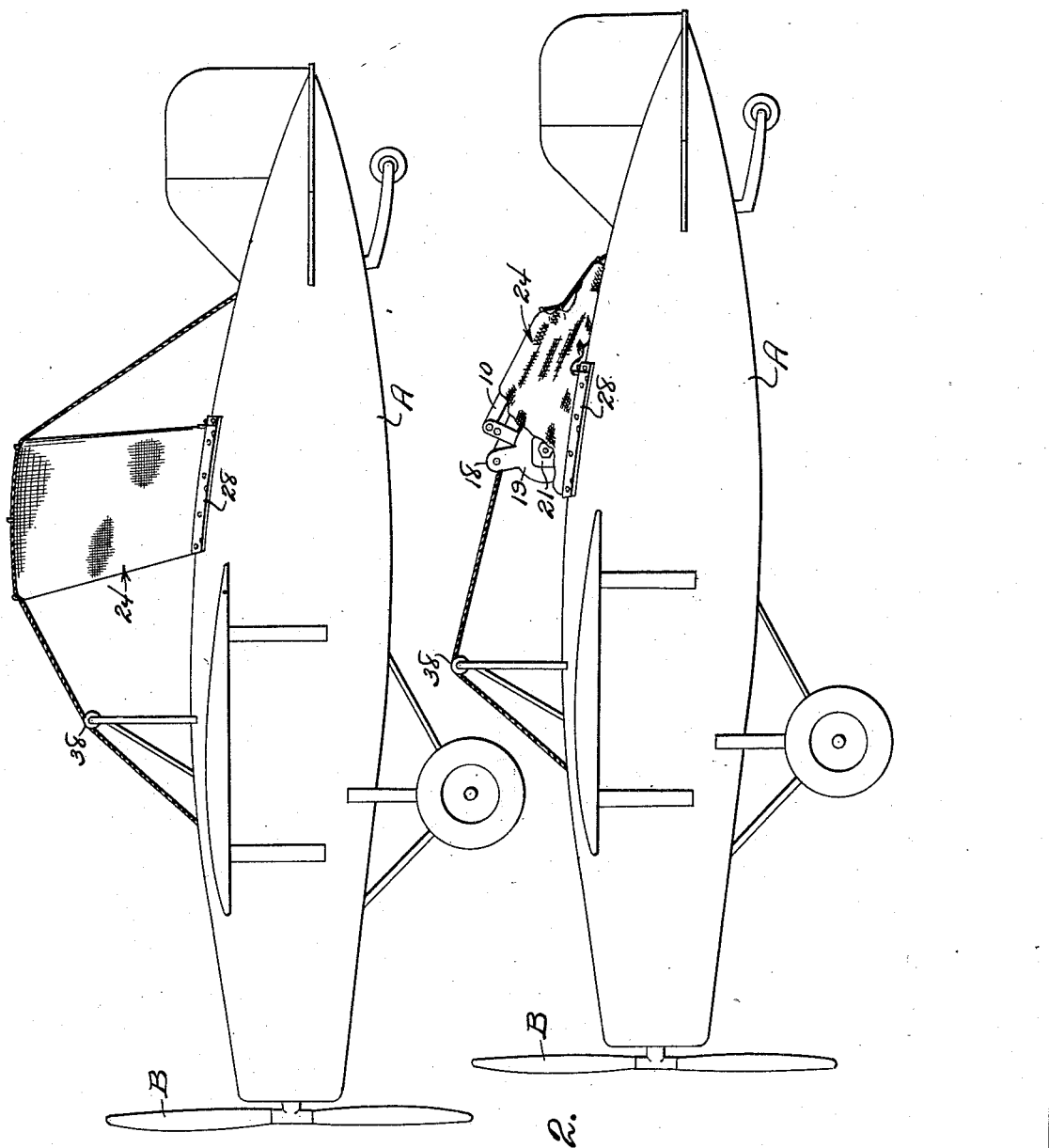

Andrew R. Baggarly
INVENTOR
BY Victor J. Evans
and Co. ATTORNEY

Patented Apr. 5, 1932

1,852,912

UNITED STATES PATENT OFFICE

ANDREW R. BAGGARLY, OF PORTSMOUTH, VIRGINIA

AEROPLANE BRAKE

Application filed October 19, 1931. Serial No. 569,762.

The invention relates to braking mechanism and more especially to an aeroplane safety brake.

The primary object of the invention is the provision of a brake of this character wherein the mounting thereof upon an aeroplane will enable a safe landing either upon land or upon a ship at sea when operated, the brake being under the control of the pilot or operator of the aeroplane and is operable for the collapsing or folding thereof when to be inactive or set up for use for braking purposes in the flight of such aeroplane.

Another object of the invention is the provision of a brake of this character wherein in the use thereof it will eliminate the possibility of a tail-spin by an aeroplane carrying the same and also will avoid the sudden descent or dropping of the aeroplane, the brake being adaptable for usage in bringing the aeroplane safely to a landing and is adaptable for use on various types of aircraft, such for example as passenger planes, war planes, mail carrying planes or the like, the brake being of novel form so as to pocket air counter to the line of flight of the aircraft and in this manner enabling the braking of the speed of such craft and also balancing the same for a landing with safety and in the least possible space.

A further object of the invention is the provision of a brake of this character, wherein the same simulates a bow supported canopy closed at one side and open at the other when extended, the open side being directed in the line of flight of an aircraft and this canopy will operate to pocket air against the pull of the propeller of the craft and thus the resistance of the pocketed air will serve to permit safe descent of the craft for the landing thereof without undue or excess travel thereof upon its landing foundation, the canopy being foldable in a manner to be out of the way upon the body or fuselage of the craft and such canopy is controllable directly by the pilot of the craft, so that when the latter is in flight and there appears liability of a sudden descent or the crashing of the craft to earth the pilot will have at his command the brake for assurance of a safe landing.

A still further object of the invention is the provision of a brake of this character which is extremely simple in its construction, thoroughly reliable and efficient in its operation and purposes, strong, durable, readily and easily operated to active or inactive positions with control by a pilot of an aircraft, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a side elevation of an aeroplane showing the brake constructed in accordance with the invention applied and in braking position.

Figure 2 is a view simulating Figure 1 showing the brake in folded or collapsed inactive position.

Figure 3 is an enlarged front elevation of the brake in extended braking position.

Figure 4 is a sectional view on the line 4—4 of Figure 3 looking in the direction of the arrows.

Similar reference characters indicate corresponding parts throughout the several views in the drawings.

Figure 6:
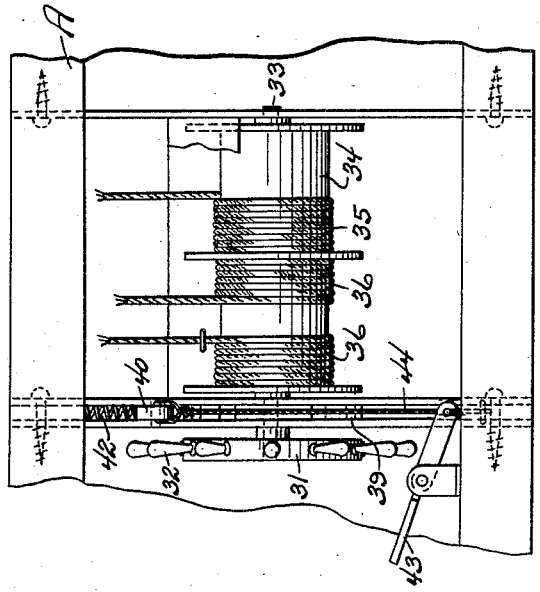
Figure 6 is a side elevation of such mechanism and looking thereto at right angles to the position of the parts in Figure 5, portions being broken away for disclosing adjunct details.
Figure 5:
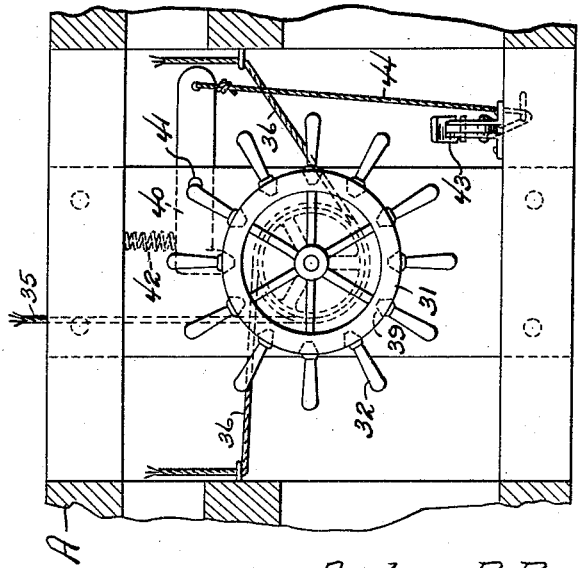
Figure 5 is a fragmentary vertical sectional view taken through the pilot or cockpit of the aeroplane body or fuselage showing the control mechanism for the brake.

Referring to the drawings in detail A designates generally the body or fuselage of an aeroplane which may be of any standard construction having at its nose or front end the propeller B which gives flight thereto. Upon the body or fuselage A is carried the brake constituting the present invention and hereinafter fully described.

The brake comprises a series of bows 10, 11 and 12 respectively, these being suitably fitted in socketed extensions 13 of pivot eyes or ears 14. The bow 10 has its pivot eyes or ears 14 swingingly connected by pivots 15 to outwardly extending lugs 16 on the pivot eyes or ears at their socketed extensions carrying the bow 11 and its eyes or ears are swingingly connected by a pivot 17 and offsets 18 tangentially disposed and each formed upon a rotatable disk-like hinge 19, the latter being supported and eccentrically movable upon a pivot 20 of a bearing 21, there being a pair of these. The bearings 21 are rigidly carried by the frame structure of the fuselage or body A and project through the top thereof rearwardly of the location of the pilot or cockpit. Each hinge 19 is provided with an arcuate-shaped slot 22 extending a distance from its center and receives the pivot 20' so that the hinge in the movement thereof has an eccentric motion. The bow 12 has each of its pivot eyes or ears swingingly connected by a pivot 23 eccentrically arranged on the hinge 19 rearwardly of and spaced from the offsets 18 thereof, the pivotal mounting of the bows 10, 11 and 12 being shown in detail in Figure 4 of the drawings.

Carried by the bows 10, 11 and 12 is a collapsible and extensible canopy 24 open at its front and closed at its rear, the lower edges of the sides 25 and rear wall 26 respectively being made fast to the body or fuselage A through the medium of fasteners 27 and angle strips 28, the latter being secured in any suitable manner to said body or fuselage. The bows 10, 11 and 12 are preferably fitted in casements 29 formed in the top 30 and upper portions of the sides 25 of the canopy 24, these casements 29 joining the canopy with said bows in a manner to permit the collapsing or extending of the canopy with the bows when in position for extending such canopy to hold the same taut and in a position for the pocketing of air admitted through its open front.

Suitably arranged and supported within the cockpit or at a convenient point within the body or fuselage A for access by the pilot or operator of the aeroplane is a hand operated turning wheel 31 having at its periphery the equi-distanced radially projected handles 32 and the axle 33 of this wheel is suitably journaled horizontally and has fixed thereto a drum or windlass 34 about which are trained cables 35 and 36 respectively, these being adapted to be wound upon and unwound from such windlass or drum, the cable 35 having connection 37 with the bow 10 and is extended over a guide 38 forwardly of the canopy 24, while the cable 36 is of duplex character and is carried rearwardly through the body or fuselage A thence upwardly, being suitably guided in this direction over the top 30 of the canopy 24 and has attachment at 38' with the bow 10 at opposite sides of the connection 37 and on manipulating the wheel 31 the canopy 24 can be raised for the extension thereof into braking position and also lowered to folding or collapsed position, the extended braking position being shown in Figure 1 while the collapsed or folding position is shown in Figure 2 of the drawings.

The axle 33 of the wheel 31 carries a cog gear 39 with which is engageable a latching dog 40 supported upon a pivot 41 and held in latching position through the medium of a coiled tensioning spring 42 so that the drum or windlass 34 will be locked against rotation until released by the dog 40. The dog 40 is releasable by a foot pedal 43 having the connection 44 therewith and this pedal 43 is conveniently located relative to the wheel 31 so that the pilot or operator of the aircraft will have perfect control of the brake and the canopy 24 thereof can be raised and lowered or extended or collapsed with dispatch.

It should be apparent that when the canopy 24 is raised or extended for braking position air currents will be pocketed thereby as the air in the line of flight of the aeroplane will be subjected to a back pressure and thus the speed of flight of the plane will be interrupted and such plane caused to descend for a safe landing thereof and within a small area or space. The pocketed air by the brake will balance the aeroplane and give the same a sufficient lift to prevent sudden dropping or crashing of the plane to earth or the ground. Also the brake by the construction hereinbefore described will avoid a tail-spin of the aeroplane or the turning over thereof under the braking action when in flight. The speed of flight of course is controllable by the pilot or operator of the machine through the motor of such plane.

It also will be apparent that when the canopy 24 is folded or collapsed the bows 10, 11 and 12 through the pivotal connection thereof and the hinges will swing into compact relation to each other and become lowered with respect to the body or fuselage A of the aircraft, the position of such bows being shown in Figure 2 of the drawings when the canopy 24 is folded or collapsed.

The canopy 24 can be made from any suitable material of a quality and character to sustain the air impact as will be imposed thereon when in braking position.

What is claimed is:—

1. In an aeroplane, a fuselage, bearings upon the fuselage and extended upwardly therefrom, rotatable disk-like hinges eccentrically pivoted to the bearings, a plurality of bows, pivots eccentrically connecting certain of the bows with the hinges, means pivotally offsetting the remaining bow and connecting the same with one of the bows eccentrically pivoted to the hinges, a canopy carried by the bows and fixed to the fuselage to present an open front, closed sides, top and back, winding and unwinding means within the fuselage, and cables carried by said means and connected with the foremost bow to permit raising and lowering of all the bows and imparting eccentric movement to the hinges.

2. In an aeroplane, a fuselage, bearings upon the fuselage and extended upwardly therefrom, rotatable disk-like hinges eccentrically pivoted to the bearings, a plurality of bows, pivots eccentrically connecting certain of the bows with the hinges, means pivotally offsetting the remaining bow and connecting the same with one of the bows eccentrically pivoted to the hinges, a canopy carried by the bows and fixed to the fuselage to present an open front, closed sides, top and back, winding and unwinding means within the fuselage, cables carried by said means and connected with the foremost bow to permit raising and lowering of all the bows and imparting eccentric movement to the hinges, and means for latching the last named means and foot controlled.

3. In an aeroplane, a fuselage, bearings upon the fuselage and extended upwardly therefrom, rotatable disk-like hinges eccentrically pivoted to the bearings, a plurality of bows, pivots eccentrically connecting certain of the bows with the hinges, means pivotally offsetting the remaining bow and connecting the same with one of the bows eccentrically pivoted to the hinges, a canopy carried by the bows and fixed to the fuselage to present an open front, closed sides, top and back, winding and unwinding means within the fuselage, cables carried by said means and connected with the foremost bow to permit raising and lowering of all the bows and imparting eccentric movement to the hinges, means for latching the last named means and foot controlled, and means for imparting movement to the first named means on release thereof.

In testimony whereof I affix my signature.

ANDREW R. BAGGARLY.